United States Patent [19]

Gioutsos

[11] Patent Number: 5,559,699
[45] Date of Patent: Sep. 24, 1996

[54] MATCHED FILTER FOR VEHICLE CRASH DISCRIMINATION

[75] Inventor: Tony Gioutsos, Brighton, Mich.

[73] Assignee: Automotive Systems Laboratory, Inc., Franklin Hills, Mich.

[21] Appl. No.: 296,524

[22] Filed: Aug. 26, 1994

[51] Int. Cl.⁶ .................................................. B60R 21/00
[52] U.S. Cl. .................................................... 364/424.05
[58] Field of Search ........................ 364/424.05, 424.01; 340/436, 437, 438; 280/735; 180/274, 282; 307/10.1

[56] References Cited

U.S. PATENT DOCUMENTS

| | | | |
|---|---|---|---|
| 5,036,467 | 7/1991 | Blackburn et al. | 364/424.05 |
| 5,067,745 | 11/1991 | Yoshikawa | 280/735 |
| 5,068,793 | 11/1991 | Condne et al. | 364/424.05 |
| 5,251,161 | 10/1993 | Gioutsos et al. | 364/578 |
| 5,282,134 | 1/1994 | Gioutsos et al. | 364/424.05 |
| 5,309,138 | 5/1994 | Tohbaru | 340/436 |
| 5,339,242 | 8/1994 | Reid et al. | 364/424.05 |
| 5,345,402 | 9/1994 | Gioutsos et al. | 364/578 |
| 5,363,302 | 11/1994 | Allen et al. | 364/424.05 |
| 5,396,424 | 3/1995 | Moriyama et al. | 364/424.05 |
| 5,402,343 | 3/1995 | Shibata et al. | 364/424.05 |
| 5,436,838 | 7/1995 | Miyamori | 364/424.05 |
| 5,440,485 | 8/1995 | Okimoto et al. | 364/424.05 |
| 5,446,661 | 8/1995 | Gioutsos et al. | 364/424.05 |

Primary Examiner—Kevin J. Teska
Assistant Examiner—Stephen J. Walder, Jr.
Attorney, Agent, or Firm—Lyman R. Lyon

[57] ABSTRACT

A matched filter (14) for vehicle crash discrimination system (10) utilizes at least one set of n scaling factors stored in a memory (24) to combine (22) with a set of n time sequenced acceleration data samples. The values of the n scaling factors are selected to effect a desired vehicle crash discrimination strategy. The matched filter optimizes system design flexibility and reconfigurability by allowing different strategies to be implemented simply by selecting the appropriate scaling factors stored in the memory.

3 Claims, 2 Drawing Sheets

MATCHED FILTER FOR VEHICLE CRASH DISCRIMINATION

BACKGROUND OF THE INVENTION

The present invention generally relates to vehicle crash discrimination systems used in controlling the actuation of an occupant safety restraint, such as an air bag, and more particularly to optimizing implementation of a vehicle crash discrimination system.

Generally, a variety of systems and methods are utilized for sensing a vehicle crash or sudden vehicle deceleration and deploying a vehicle safety device such as an air bag, or locking a seat belt, or actuating a pretensioner for a seat belt retractor. Typically, the safety device is triggered or otherwise deployed into its protective position when the system detects an impact or deceleration exceeding a threshold value therefor. These known systems and methods are generally designed around a predetermined crash discrimination strategy. Which looks to various designed physical measures, such as vehicle velocity, or change in velocity (jerk value), to provide crash detection.

However, to be effective, most crash discrimination strategies and their attendant threshold values tend to be narrowly tailored to specific vehicle makes and models, and/or specific types of vehicle crashes. Therefore, because known crash discrimination systems implement desired crash discrimination strategies using specific hardware and/or firmware designed to provide the necessary narrow tailoring, these systems are extremely difficult if not impossible to redesign or reconfigure for use with different crash strategies or vehicle types. The rigidity built into the system designs simply does not facilitate easy and cost effective modification, updating, and/or reconfiguration of the system.

SUMMARY OF THE INVENTION

It is therefore an object of the present invention to provide a matched filter arranged to optimize the reconfigurability and flexibility in designing a vehicle crash discrimination system.

It is also an object of the present invention to provide a matched filter which applies predetermined scaling factors to vehicle acceleration data to effect a crash discrimination analysis or strategy.

It is another object of the present invention to optimize the design flexibility in a vehicle crash discrimination system by providing a matched filter so that the crash discrimination system can be easily reconfigured by changing a set of scaling factors stored in the matched filter.

In accordance with the present invention, a matched filter for a vehicle crash discrimination system processes data representative of vehicle acceleration into a discrimination output value suitable for determining whether to deploy an occupant safety restraint device. The filter comprises an input means for organizing the acceleration data into n time sequential data samples ranging from a current sample to an $n^{th}$ oldest sample, a memory means for storing at least one set of n predetermined scaling factors, and means for combining each of the n data samples with a predefined one of the n scaling factors. The respective values of the n scaling factors are predetermined to effect a particular vehicle crash discrimination strategy. A means for combining the n scaled data samples produces the discrimination output value.

In a first filter arrangement, the respective values of the at least one set of n scaling factors are selected to exponentially reduce the oldest acceleration data samples to provide a discrimination output value representative of vehicle velocity incorporated with a damped memory of past vehicle acceleration. In a second filter arrangement, two sets of n scaling factors are used to provide discrimination of long-period, low-velocity crashes. A first set of scaling factors are selected to provide a discrimination output value representative of vehicle velocity, and a second set of scaling factors are selected to provide a discrimination output value representative of a jerk value.

The present invention will be more fully understood upon reading the following detailed description of the preferred embodiment in conjunction with the accompanying drawings.

DETAILED DESCRIPTION OF THE PREFERRED EMBODIMENT(S)

Figure 1:
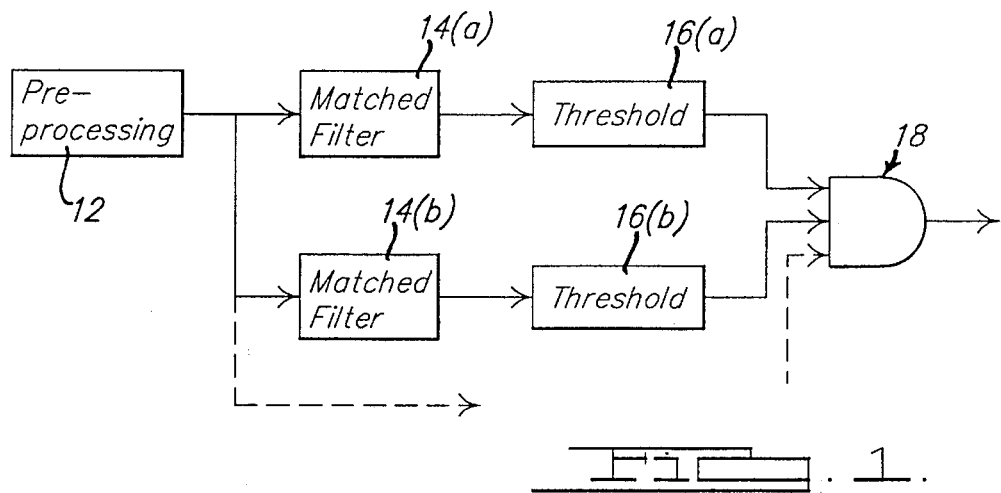
FIG. 1 is a block circuit diagram illustrating a vehicle crash discrimination system in accordance with the present invention.

As shown in FIG. 1, a crash discrimination system 10 in accordance with the present invention receives raw vehicle acceleration data from at lest one accelerometer at an input data pre-processing stage 12. The pre-processing stage 12 can include signal processing circuitry such as an A/D convertor, filter, natural log calculating means and autocorrelator, as described in U.S. Pat. No. 5,282,134 and incorporated by reference herein. The output generated by the pre-processing stage 12 is then applied to crash discrimination match filter stages 14(a) and 14(b) for processing into output data suitable for comparison with at least one predetermined threshold value in a corresponding decisional stage 16(a) and 16(b). Responsive to the threshold comparison, the decisional discrimination process includes an AND gate 18 for controlling actuation of a vehicle occupant safety restraint device, such as an air bag.

Figure 2:
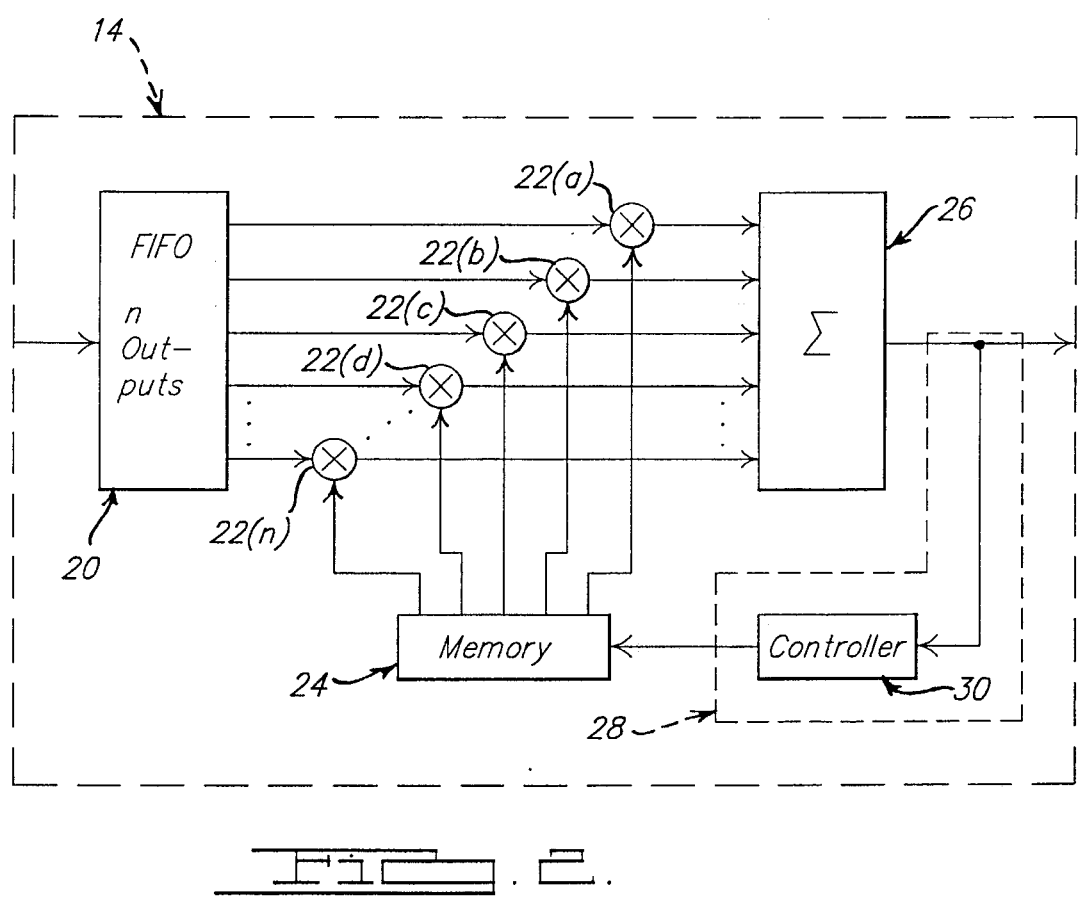
FIG. 2 is a block circuit diagram of a matched filter in accordance with the present invention.

The present invention achieves optimal design flexibility by performing the appropriate vehicle crash discrimination analysis with the matched filter 14 to effect the desired crash discrimination strategy. As shown in FIG. 2, the match filter 14 includes a FIFO register having sequentially ordered output slots each input into a corresponding multiplying or summing junction 22 (a)–(n). A memory device 24, such as a ROM, applies a predetermined set of n scaling factors to the multiplying junctions 22(a)–(n) to effect the crash discrimination processing on the received vehicle acceleration data samples. The n scaled acceleration data samples are then summed in a summer unit 26 for output to the corresponding threshold comparison stage 16. The scaled data samples could alternatively be accumulated in an accumulator.

Figure 3:
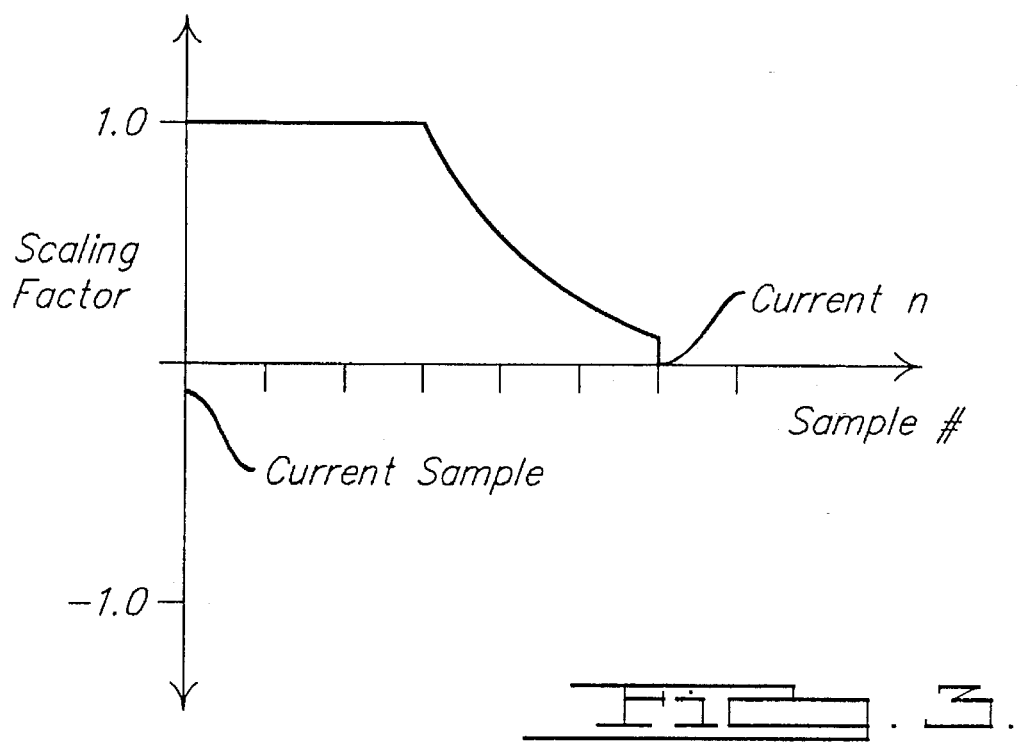
FIG. 3 is a graph illustrating a set of scaling factors for a first filter arrangement.

In accordance with the present invention, each set of n scaling factors are calculated to provide an overall crash discrimination processing analysis to the received acceleration data samples. For example, FIG. 3 illustrates a first set of n scaling factors which allows the matched filter to determine vehicle velocity while damping older acceleration samples. More specifically, 100% of the values of the most current n number of data samples are used to calculate the velocity, while the values of the older n number of data samples are made exponentially smaller. Thus, the newer samples are provided with a scaling factor of 1.0, and the older samples are provided with exponentionally smaller scaling factors. This arrangement provides a velocity calculation with a built in "memory" of past events.

Figure 4:
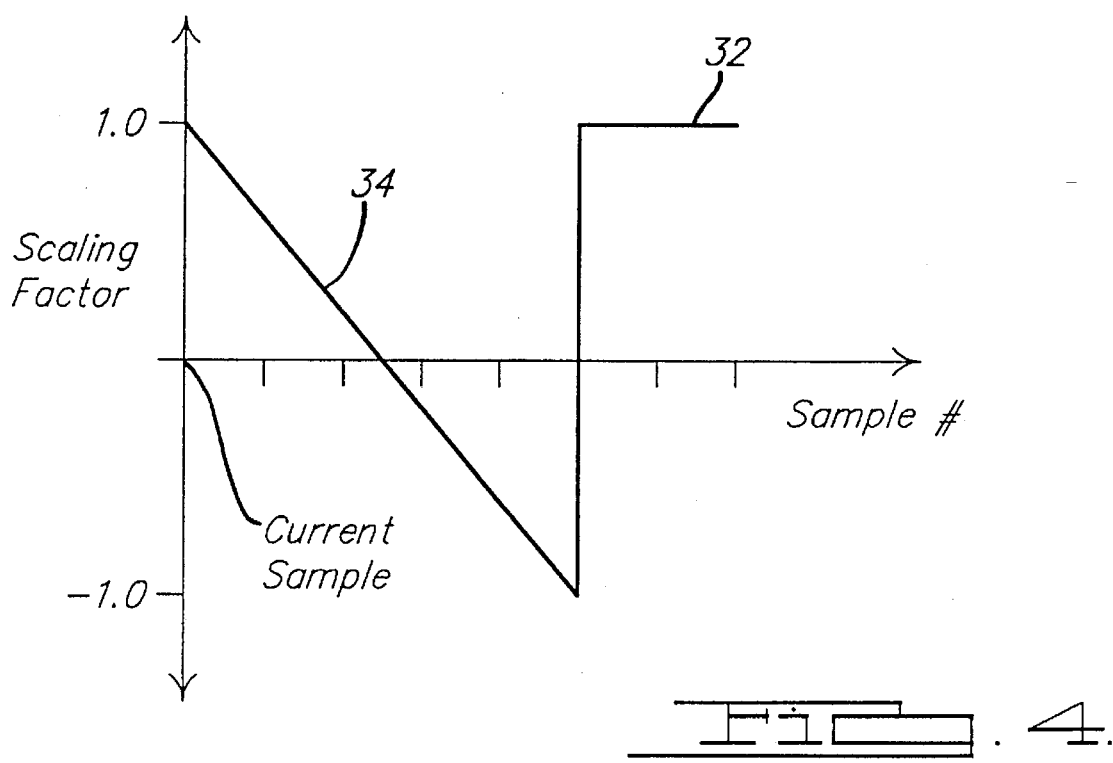
FIG. 4 is a graph illustrating a set of scaling factors for a second filter arrangement.

FIG. 4 illustrates a second arrangement of n scaling factors which provides crash discrimination for long-period, low-velocity type crashes. As described in co-pending application Ser. No. 07/874,431 entitled "Method for Discriminating Long-Period, Low-Velocity Crashes," filed Apr. 27, 1992, incorporated by reference herein, the wide gray area between "fire" and "no fire" crash situations provides difficulty in accurately discriminating slowly developing type vehicle crashes. The method described in Ser. No. 07/874, 431, provides accurate discrimination for these type of crashes by comparing the vehicle velocity data to a threshold value which is approximately equal to half the velocity of a maximum-allowable low-velocity crash without actuating a vehicle safety device, such as an air bag. If the velocity threshold is exceeded, the slope of the velocity, i.e. jerk value, is calculated and compared to a slope threshold value. If the slope threshold is exceeded, the safety device is actuated or fired.

As shown in FIG. 4, the present invention achieves this type of crash strategy arrangement in a matched filter by using two separate sets of scaling factors which are selectively applied under control of a feedback loop 28 and controller 30. More specifically, the first set of scaling factors (designated as 32) comprise a set of ones (1.0) applied to the acceleration samples to determine the velocity. Alternatively, a damped arrangement such as shown in FIG. 3 could be employed. Once the feedback 28/controller 30 determines that the velocity threshold equal to half the velocity of a maximum-allowable low-velocity crash has been exceeded, the second set of scaling factors (designated as 34) ranging from −1.0 to 1.0 are applied to the acceleration data samples to effect calculation of the slope at the accumulator.

Thus, by utilizing one or more match filters to implement a predetermined crash discrimination analysis, the present invention advantageously provides system design flexibility. Different crash discrimination processes or strategies can be implemented simply by changing the scaling factors stored in the memory 24. While the invention has been shown as utilizing at least two matched filters, one of ordinary skill in the art will appreciate that any number of different matched filters can be employed in a single crash discrimination system.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. A matched filter for processing data representative of vehicle acceleration to produce a discrimination output value suitable for threshold comparison to determine whether to deploy an occupant safety restraint device, said filter comprising:

an input means for organizing the acceleration data into n time sequential data samples ranging from a current sample to an $n^{th}$ oldest sample;

a memory means for storing at least one set of n predetermined scaling factors;

means for combining each of the n data samples with a predefined one of the n scaling factors, wherein the respective values of said n scaling factors are predetermined to effect a predetermined vehicle crash discrimination strategy; and means for combining the n scaled data samples to produce the discrimination output value.

2. The matched filter of claim 1 wherein the respective values of said at least one set of n scaling factors are selected to exponentially reduce the oldest acceleration data samples to provide a discrimination output value which is damped with respect to past vehicle acceleration.

3. The matched filter of claim 1 wherein said at least one set of n scaling factors comprises a first and second set of n scaling factors, said first set of scaling factors selected to provide a discrimination output value representative of vehicle velocity, and said second set selected to provide a discrimination output value representative of a jerk value.

* * * * *